Feb. 25, 1958     A. J. DE ROSSET     2,824,620
PURIFICATION OF HYDROGEN UTILIZING HYDROGEN-PERMEABLE MEMBRANES
Filed Sept. 12, 1955
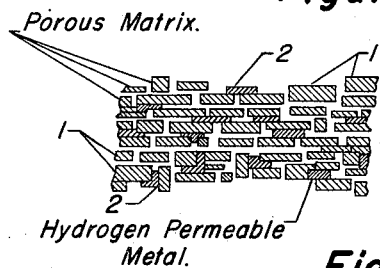
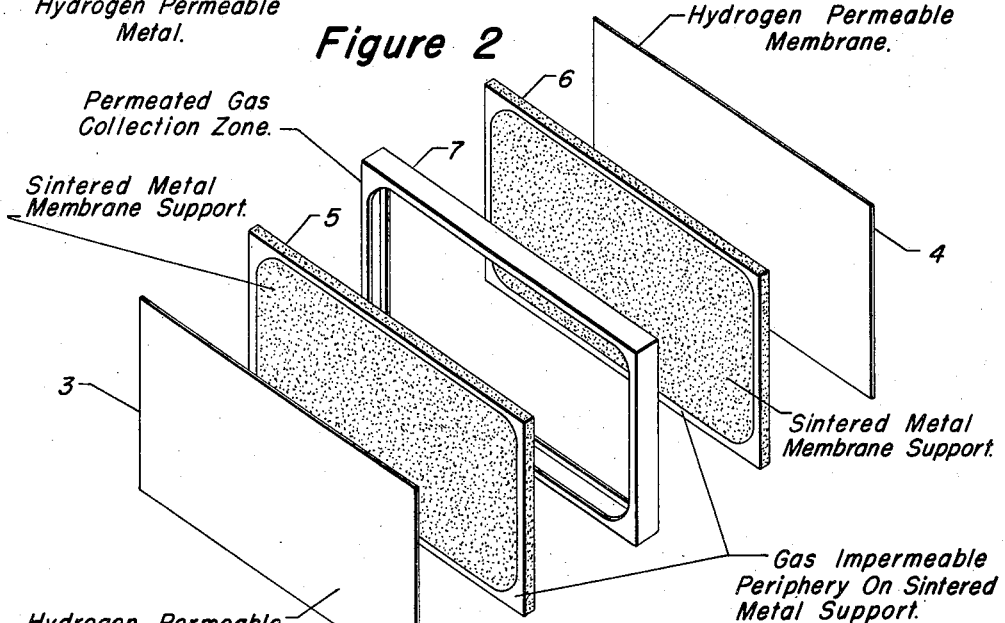
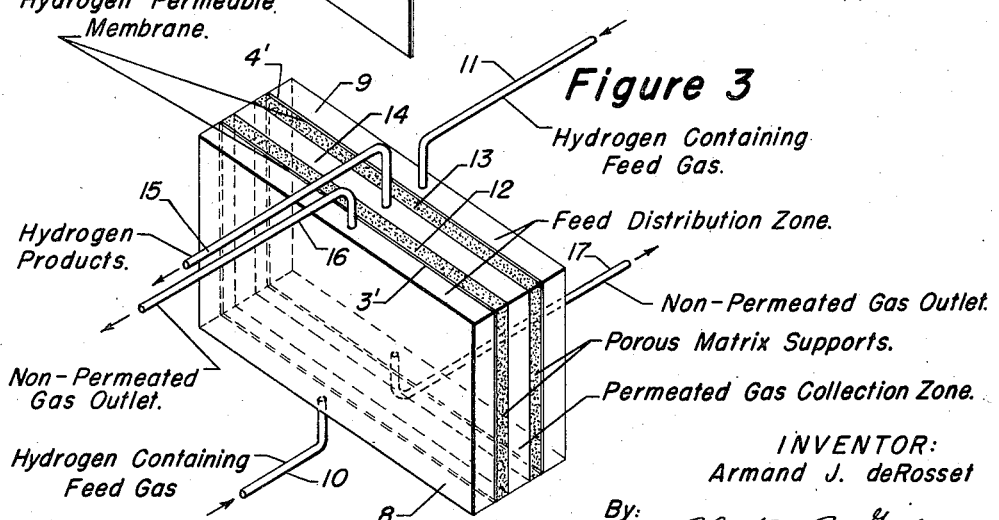
INVENTOR:
Armand J. deRosset

United States Patent Office

2,824,620
Patented Feb. 25, 1958

2,824,620

PURIFICATION OF HYDROGEN UTILIZING HYDROGEN-PERMEABLE MEMBRANES

Armand J. de Rosset, Clarendon Hills, Ill., assignor to Universal Oil Products Company, Des Plaines, Ill., a corporation of Delaware Application September 12, 1955, Serial No. 533,870

8 Claims. (Cl. 183—2)

This invention relates to the means for and the method of separating hydrogen from a mixture of gases which involves the diffusion of the hydrogen component of the gas mixture through a hydrogen-permeable membrane. More specifically, the invention relates to an apparatus and a method for separating hydrogen in a high state of purity, the method and apparatus involving the use of a membrane which is permeable only to hydrogen, which is supported by a structurally rigid, porous matrix, and which enables the use of high pressures and high throughput rates for the gaseous mixture without the necessity of frequent replacement of the gas-permeable membrane.

One object of this invention is to provide a method for purifying hydrogen whereby a product stream of high purity is capable of being produced at a high rate of production without the use of bulky or cumbersome equipment. Another object of the invention is to provide a simple means of producing a hydrogen product of substantial purity at feasibly operable temperatures and employing simple equipment for separating the hydrogen from its contaminants.

One embodiment of this invention relates to a method for increasing the concentration of hydrogen in a mixture of gases which comprises passing said mixture at an elevated pressure and temperature through a diffusion zone, separated into an upstream portion and a downstream portion by a continuous hydrogen-permeable membrane selected from a metal of group VIII of the periodic table and the hydrogen-permeable alloys of said group VIII metal, said membrane being supported on its downstream side by a porous matrix of sufficient rigidity to maintain the continuity of said membrane against the upstream pressure, collecting hydrogen on the downstream side of said membrane, and the non-hydrogen components of said mixture on the upstream side of said matrix.

Another embodiment of this invention relates to an apparatus suitable for effecting the separation of hydrogen from a mixture of gases which comprises a housing capable of confining a mixture of gases under pressure, having sealed into the sides of said housing, between the ends thereof, a structurally rigid, gas-permeable matrix, a gas inlet into the enclosure on one side of said matrix, a hydrogen outlet in the enclosure on the other side of said matrix, and a hydrogen-permeable membrane sealed into the sides of said housing and supported by said matrix on the gas inlet side and comprising a metal selected from group VIII of the periodic table and the hydrogen-permeable alloys of said group VIII metal.

It is well-known that certain metals of group VIII of the periodic table, comprising the metals known as the "iron group" are permeable to hydrogen and substantially impermeable to other gases which may be mixed therewith in the commonly found gas mixtures containing hydrogen. Relatively thin membranes of such metals have heretofore been utilized in suitable equipment to effect at a relatively low rate the separation of hydrogen from other diverse gases. However, it has been found that the use of such thin metallic membranes such as palladium foil for this method of separation are limited in their application to low pressures at a rate of hydrogen production because of the tendency of such thin membranes to rupture upon the application of even slight pressures on the upstream side of the hydrogen-permeable foil. Although palladium has been found to be one of the preferred hydrogen-permeable elements from which to fabricate such gas diffusion elements, other metals such as certain alloys of palladium, and the metals: iron, nickel, copper, platinum and molybdenum, including certain alloys of the latter metals, may be employed to improve the permeability of the membrane to hydrogen without sacrificing purity of the gaseous product or without weakening the structural properties of the membrane. Thus, silver-palladium alloys containing from small amounts up to about 60% of silver, and preferably from about 25% to 40 atom percent of silver will increase the permeation rate of hydrogen through the membrane under otherwise similar conditions. Gold-palladium alloys, preferably containing from 20% to about 40 atom percent of gold, boron-palladium alloys, preferably containing from small amounts up to 10 atom percent of boron also increase the permeability of the membrane to hydrogen.

In order to provide a membrane which will permit a reasonable throughput rate of the hydrogen-containing gas mixture and thereby permit the production of hydrogen at a reasonable rate, the resistance to flow of hydrogen through the membrane may be reduced by providing a sufficiently thin foil; alternatively, higher upstream pressures may be utilized to increase the rate of diffusion of hydrogen through the permeable membrane, but accompanying such use of higher pressures is the necessity of providing a membrane of sufficient thickness to withstand the higher pressures, without rupturing the membrane. It has been found, however, that the rate of increase in the resistance to flow of hydrogen through the hydrogen-permeable membrane as the thickness of the membrane increases is greater than the rate of increase in flow through the membrane with increases in pressure to the rupture point. Therefore, an increase in the thickness of the membrane to accommodate higher pressures defeats the purpose of higher pressures. The process employing hydrogen-permeable metal foils, for all practical purposes, is thus limited to low pressures and to low rates of hydrogen production.

The present invention provides a means for separating hydrogen by the gaseous diffusion method at a relatively high pressure, accompanied by the use of a relatively thin membrane of the hydrogen-permeable metal, thereby combining the advantages of both high upstream pressures and thin hydrogen-permeable membranes for producing hydrogen at a high rate of production. This desirable result is achieved in the present device by combining a relatively thin hydrogen-permeable membrane with a porous, structurally rigid support therefor capable of withstanding the desired operating pressures applied to the upstream side of the membrane. The porous matrix comprising the support for the membrane is a plate of substantial thickness, capable of maintaining its structural rigidity in spite of the relatively high pressure differentials between the upstream and downstream sides of the membrane, the plate having sufficient surface area surrounding the open pores to support and maintain the continuity of the membrane at all points on the membrane exposed on the upstream side to the elevated pressure. In a preferred form, the membrane is a porous matrix composed of sintered particles of metal fabricated into a plate of substantial thickness.

The porous matrix, when fabricated from a plate of sintered metal particles, is generally manufactured by partially fusing a mass of the metal in powdered or finely divided condition, accompanied by heating and compressing the mass of metal particles. Thus, a plate fabricated from powdered iron may be formed by compressing a mass of iron particles retained within a walled enclosure at a temperature near the melting point of the iron, the particles generally being compressed in an hydraulic press capable of exerting pressures of from 5000 to about 100,000 pounds per square inch. Other thermoplastic materials from which the porous matrix of the present invention may be fabricated are plastic, or resinous compositions, preferably in finely divided condition, such as powdered polystyrene, powdered polymethyl-methacrylate, powdered polyvinyl alcohol and other plastic and resinous materials of thermoplastic character, powdered glass, powdered silica, firebrick or other metals, such as zinc powder, powdered stainless steel, tin and copper dust, powdered nickel or cobalt and a variety of other metals which may be supplied to the sintering press in a size range varying from finely powdered to coarsely pelleted form, individual particles of which may vary in size from 0.1 to about 800 microns, preferably from about 1.0 to about 100 microns in diameter. The size of the particles of thermoplastic material in any event must be sufficient to produce a membrane-supporting plate having pores which will permit the free passage of molecular hydrogen through the resulting porous plate. Depending upon the choice of material from which the membrane-supporting plate is to be fabricated, which in turn depends upon the temperature of operation and the method of applying the hydrogen-permeable membrane, the material from which the porous matrix is formed may in some instances be compressed into a structurally rigid plate by the mere application of pressure, for example by the compression of certain powdered plastic or resinous materials into a porous plate. In other cases, as in the production of sintered metal particle plates, the powdered metal must be heated or a combination of both heat and pressure must be utilized to form a plate of the required structural rigidity. Thus, certain powdered stainless steels may be fabricated into a porous plate by applying an electric current of high amperage to a mass of the powdered metal, fusion of the powdered particles taking place at the boundaries of each of the particles where the electrical resistance is the greatest and local temperatures attain the melting point of the metal. In general, the preferred materials from which to fabricate the porous plate are the metal powders which provide a compressed plate of the greatest structural rigidity and strength retentiveness at the temperature of operation, the greatest resistance to warpage, the most readily controllable porosity and generally the greatest inertness to the hydrogen-containing gas stream to be separated. Thus, powdered copper or a copper-beryllium alloy may be readily fabricated into a porous metal plate by the application of pressure and temperatures of from about 1000° to about 1900° F. to a mass of powdered copper placed between a press capable of exerting moderately high pressures, the resulting plate being suitable for separation of gas mixtures comprising hydrogen and low molecular weight hydrocarbon gases or hydrogen-nitrogen mixtures, whereas sintered stainless steel powder or powdered glass may be utilized for separating corrosive gas mixtures such as mixtures of hydrogen and sulfur trioxide.

Any suitable method for fabricating a hydrogen-separation cell may be employed which will provide for collecting the diffused hydrogen component of the gas mixture in a separate zone from the non-diffusible components of the mixture, the basic requirement in fabricating an apparatus for this purpose is the provision of a continuous hydrogen-permeable membrane across every pore in the supporting matrix, the membrane, however, being impermeable to the non-hydrogen of the gas mixture. This may be provided essentially by the method of at least partially filling or sealing off the pores of the supporting matrix with the hydrogen-permeable metal, either by incorporating a continuous foil of a hydrogen-permeable metal on the upstream side of the porous matrix or by incorporating a discontinuous series of hydrogen-permeable metal particles within the porous structure of the supporting matrix, the number of pores within the matrix sealed by the metal particles being sufficient to provide a discontinuous passage to the non-hydrogen components of the gas mixture. The methods for fabricating a suitable separation unit to produce substantially pure hydrogen are numerous. In order to maintain the permeability of the hydrogen-permeable membrane at a higher level and thereby enable the use of high feed stock charging rates, it is essential to use a minimum quantity of hydrogen-permeable metal of which to construct the membrane, which quantity, however, must be sufficient to fill enough pores of the porous matrix to prevent the leakage of non-hydrogen components through the matrix. A minimum of the hydrogen-permeable metal in or on the upstream side of the porous matrix is essential because it is believed that the transport of hydrogen through the hydrogen-permeable membrane essentially involves the dissolution of the hydrogen in an atomic state in the hydrogen-permeable metal and the subsequent diffusion of the dissolved atoms of hydrogen into the zone of reduced pressure on the downstream side of the membrane. When the path through which such diffusion must take place is long, by virtue of incorporating an excessive amount of hydrogen-permeable metal into the membrane, the concentration gradient of hydrogen through the metal will be small, resulting in a low rate of diffusion and considerable resistance to flow of hydrogen through the membrane.

The above factors involved in the preparation of the hydrogen-permeable membrane or cell are illustrated in Figure I of the accompanying diagram which illustrates a porous matrix made up of variously sized particles, such as a mass of compacted, sintered powdered metal particles, exemplified by the numeral 1 in Figure I, the matrix containing discrete particles of the hydrogen-permeable metal selected from the metals of group VIII of the periodic table, and preferably the metals of series 4 and 6 of said group VIII metals, or their hydrogen-permeable alloys distributed at random throughout the matrix, but filling a sufficient number of the pores between the compacted particles to eliminate free passageways for the non-hydrogen components of the gas mixture on the upstream side of the cell. Such particles of hydrogen-permeable metal are indicated by the numeral 2 in the illustration of the cut-away portion of the hydrogen-permeable membrane shown in Figure I. It will be evident that if more than the required number of particles 2 are present in the porous matrix, undue resistance to the passage of hydrogen will be encountered because of the necessity of the hydrogen to dissolve in the metal before continuing its passage by diffusion through the porous structure. It is also evident that no more particles of the hydrogen-permeable metal are required in the matrix than will prevent a free passageway for the stream of non-hydrogen components on the up-stream side of the membrane.

When referred to herein, the term "membrane" is intended to designate a continuous foil or film of the hydrogen-permeable metal or a discontinuous series of particles of the metal, providing a number of membrane elements distributed in the matrix support, either of which is impervious or forms a barrier to the passage of the non-hydrogen component or components of the feed stock gas mixture charged into the diffusion apparatus. Thus, the membrane may consist of a series of minute particles of only fractional micron thickness distributed at various levels in a porous matrix, and which, taken together, over the tranverse area of the matrix presents an impervious barrier to the non-permeable gaseous components. The term "porous" as utilized herein, indicates a structural condition in which spaced voids are dispersed throughout a solid mass and in sufficient number and continuity to permit fluid flow through the mass, while the term "permeable" is intended to characterize a condition which permits diffusion through the mechanism of dissolution, followed by displacement.

A number of methods may be utilized to form the hydrogen-permeable membrane comprising the diffusion apparatus of this invention. Thus, a relatively thick hydrogen-permeable foil, for example a foil of from 0.5 to about 20 microns in thickness may be placed upon the surface of a porous plate constituting the membrane support and the resulting combination placed in the diffusion cell as the hydrogen-permeable element of the apparatus. The thickness of the foil in this modification of the present apparatus should be only sufficient to withstand the pressure differential between the upstream and downstream sides of the foil without yielding to the pressure and forming a fissure or aperture through which the gaseous mixture may flow. The required thickness of foil, will, in general, depend upon the size of the pores in the matrix background and will also be determined by the desired rate of diffusion, which is inversely proportional to the thickness of the foil and varies directly with the pressure and temperature of the gaseous mixture impressed on the upstream surface of the foil. Since these are mutually dependent factors, each must be determined by trial and error methods of the particular system involved.

One of the preferred methods of preparing the hydrogen-permeable membrane comprises depositing a thin foil on the surface of the matrix and subjecting the resulting combination to fluid pressure, such as to the pressure of the feed stock gaseous mixture at a pressure level at least as great as the pressure to be employed in the gas diffusion process and thereafter determining the purity of the hydrogen diffused through the membrane to the downstream side thereof. If the resulting hydrogen product is not of the desired purity, another layer of the hydrogen-permeable foil may be placed over the layer previously deposited and the procedure again repeated until the continuity of the resulting membrane is sufficient to yield a diffused product of the desired purity. The thin foil from which the ultimate membrane is fabricated through the repeated applications of the foil to the porous plate may, for example, be a foil having a thickness of from $4 \times 10^{-6}$ to about $4 \times 10^{-4}$ inches in thickness (approximately $1.0 \times 10^{-1}$ to about 10 microns). When it is desired that the thickness of the membrane be increased gradually by the application of successive layers of foil to the upstream surface of the plate, the foil is preferably thin, such as foil of 0.1 micron thickness. Instead of applying the foil by the application of fluid pressure to a subadjacent layer of foil previously applied, the foil may be pressed into the pores of the matrix by burnishing after each application. In general, in preparing this type of layered membrane, it is preferred that the pores of the matrix be substantially of uniform size and that the pore diameter be not greater than about 100 microns.

Figure 2 illustrates a typical arrangement of a type of apparatus utilizing a foil of the hydrogen-permeable metal as the membrane in the present gas diffusion process. Referring to Figure 2 which is an isometric view of the internal portions of a typical gas diffusion cell, the cell is disintegrated to indicate the arrangement of the several portions of the apparatus which in its assembled form provides a unit similar to that shown in Figure 3. In order to provide a working model having a minimum number of component parts, a single hydrogen collection zone may be employed in combination with two hydrogen-permeable membranes and two membrane supports comprising the porous matrices therefor, the apparatus providing for two upstream inlets, with the hydrogen product diffusing into an intermediate hydrogen-collecting zone. The permeable membrane on the two upstream sides is indicated in Figure 2 by the numerals 3 and 4 and the adjacent porous matrices therefor by the numerals 5 and 6 for said permeable membranes, respectively. The hydrogen collection zone which is placed between the downstream sides of two opposing porous matrices 5 and 6 is indicated in Figure 2 by numeral 7. These may be clamped or bolted together into a unit, each of the pieces comprising the unit being sealed around their perimeters to prevent leakage of gas from the unit by means of a gasket, not shown, or by polishing the peripheral edges of the pieces to provide an hermetically sealed union between the individual portions of the apparatus. Figure 3 illustrates one form of a typical gas diffusion apparatus embodying the elements of this invention, above described, together with feed distribution zones 8 and 9 on the upstream sides of the hydrogen-permeable membrane on each end of the apparatus which also have their peripheral edges sealed against the hydrogen-permeable membrane, as shown in Figure 3. The feed distribution zones 8 and 9 are connected to feed lines 10 and 11, respectively, which supply the respective zones with the hydrogen-containing gas mixture to be separated. The feed gas mixture is preferably heated to an elevated temperature within the range of from about 150° to about 1500° F., preferably to a temperature above about 200° F., up to about 1000° F., in order to increase the rate of hydrogen diffusion. The hydrogen component of the gas mixture, which, under the temperature and pressure conditions maintained within the feed distribution zones, diffuses through hydrogen-permeable membranes 3' and 4', respectively, flows under the pressure existing within zones 8 and 9 through the porous membrane supports 12 and 13, respectively, into hydrogen-collection zone 14, the pressure differential between the feed-distribution zone and the hydrogen-collection zone being at least 10 pounds per square inch, and preferably from 20 to about 1500 pounds per square inch, in order to obtain a positive flow of hydrogen from the upstream side of the hydrogen-permeable membrane into the hydrogen-collecting zone. As hydrogen accumulates in zone 14, it is desirably withdrawn therefrom through line 15 into storage or for disposition to other uses. The flow of hydrogen-containing feed gas into feed distribution zones 8 and 9, respectively, is preferably countercurrent in order to take advantage of the concentration gradient effect inherent in gaseous diffusion; thus, the non-permeated gas outlets are desirably located on the feed-collection zone on the side opposite to the feed gas inlet. This arrangement is illustrated in Figure 3 by pipes 16 and 17 which connect with the feed-distribution zones 8 and 9, respectively, through openings on the side opposite to the feed inlet openings 10 and 11, repectively.

Although the foil-type membrane constitutes one of the preferred forms of the hydrogen-permeable metal which may be employed in the present gas diffusion cell, as illustrated in Figure 3, other types of preformed membranes may be utilized, as hereinafter indicated, to provide suitable hydrogen-diffusion membranes.

A simulated foil membrane which has certain advantages in its use over a continuous foil, above illustrated, the advantages thereof generally arising in the ease of preparing the same and the mechanical stability of the resulting membrane, may be formed by dusting the surface of the porous matrix with the hydrogen-permeable metal in powdered form utilizing a quantity of the powdered metal sufficient to reduce the perviousness of the resulting metal film to the non-hydrogen components of the gas mixture to the desired level. Thus, palladium powder may be placed on the surface of the porous matrix and thereafter burnished or polished to form a more continuous film over the pores of the supporting matrix. Another convenient method of placing a hydrogen-permeable metal film on the surface of the porous support, the method being one of the preferred means for fabricating the hydrogen-permeable membrane when a sintered metal powder plate is utilized in the apparatus, comprises electroplating the desired hydrogen-permeable metal or alloy on the upstream side of the porous support. Thus, palladium may be readily electroplated on the surface of a sintered stainless steel powder plate by methods and procedures well-known in the electroplating art. The electroplating process may be continued and the continuity of the hydrogen-permeable metal layer on the porous support developed to a degree sufficient to reduce the perviousness of the resulting membrane to the non-hydrogen components of the feed gas to the desired level. An alloy of the hydrogen-permeable metal, such as a platinum-silver alloy, may also be electroplated directly upon the porous plate.

Another method of applying a superficial layer or modified foil of the hydrogen-permeable metal on the upstream side of the porous matrix comprises permitting vapors of the metal to impinge on the surface of the matrix, usually by heating the metal in a high temperature electric arc (for example, electrodes fabricated from carbon) and allowing the vapors to rise to the flat surface of the matrix held above the metal being vaporized, as for example, above the electrodes. The vaporization may be effected under vacuum conditions, for example at 0.01 to 10 mm. Hg pressure, in order to increase the rate of vaporization at a lower temperature level. Suitable hydrogen-permeable metals utilizable in the application of the latter technique are palladium and palladium-silver alloys, among others.

Still another method of placing a hydrogen-permeable metal film on the surface of a porous matrix comprises spraying the metal in molten condition onto the surface of the matrix maintained at a temperature below the melting point of the hydrogen-permeable metal, the process being generally known by the term "metalizing." Preferably the sprayed layer or film of metal is built up by succeeding applications of thin layers, applied in the form of finely divided droplets, the size of the sprayed droplets decreasing as the velocity of gas through the metalizing equipment increases. The preferred metals for this purpose are the relatively low melting point metals such as palladium and copper.

Another method of fabricating the hydrogen-diffusion cell by incorporating the hydrogen-permeable metal into the porous support therefor, particularly when a support such as baked fireclay, compacted silica particles, charcoal, compacted asbestos fibers or other generally non-metallic porous supporting material is utilized, although not necessarily limited thereto, comprises impregnating the porous matrix with a decomposable salt of a hydrogen-permeable metal (for example, palladium nitrate) or with a mixture of the decomposable salts of a hydrogen-permeable metal with an alloying metal thereof, and thereafter reducing the salt or salts contained within the porous support to produce a metallic deposit of the hydrogen-permeable metal or alloy within the matrix of the porous support. Salt solutions of various concentrations may be employed to control the perviousness of the resulting membrane to the non-hydrogen components of the feed mixture, the perviousness decreasing as the concentration of salts in the impregnating solution increases. A suitable method for gradually increasing the continuity of the membrane to the desired degree for the required purity of product to thereby determine the minimum quantity of hydrogen-permeable metal for maximum purity of the hydrogen product comprises impregnating the porous membrane with a dilute solution of the hydrogen-permeable metal salt, thereafter decomposing the salt, determining the purity of hydrogen by trial and if the latter is not sufficiently pure, repeating the above series of steps until a product of the desired purity is obtained. A suitable class of salts for this purpose are the nitrates which may be readily reduced by hydrogen or the metal precipitated therefrom with hydrogen sulfide, followed by oxidation of the metal sulfide with air or oxygen.

Still another method for incorporating the hydrogen-permeable metal into the matrix of the porous support comprises mixing the hydrogen-permeable metal in powdered form with the matrix-forming material before the latter is compacted and/or sintered, thereby preparing the matrix and the membrane in the same operation. This method is particularly suitable when the supporting matrix is a sintered metal powder, such as a sintered stainless steel powder. In this method, the perviousness of the resulting membrane, in combination with the desired porous matrix is directly proportional to the amount of powdered hydrogen-permeable metal incorporated into the matrix-forming material or by varying the mechanical and thermal treatment of the formed matrix-membrane combination to provide a membrane of the desired perviousness. Thus, the perviousness of the combined matrix and membrane may be reduced by sintering the metal powder at a higher temperature, thereby at least partially sealing the porous structure of the matrix while not substantially affecting the permeability of the membrane to hydrogen diffusion.

It is evident that other methods of incorporating the membrane into the porous matrix and other arrangements of the structural elements of the apparatus may be employed, these methods being within the skill of the art and contemplated herein. Thus, for example, two or more of the hydrogen diffusion cells may be interconnected in series, with or without intermediate compressors between each of the cells in order to produce a hydrogen product of greater purity by subjecting the diffusate from one cell to additional treatment in succeeding cells or by subjecting the non-diffused effluent to additional hydrogen diffusion treatments.

The method of separation provided herein may be adapted to many types of feed stocks, including corrosive mixtures as well as substantially inert mixtures of hydrogen-containing gases. Thus, hydrogen may be recovered from mixtures containing low molecular weight hydrocarbons such as methane, ethane, ethylene, etc., as, for example, the non-condensable gases formed in thermal or catalytic cracking of petroleum crudes or from dilute hydrogen-containing gas streams, such as the lean gas effluent of an absorber operated in conjunction with a catalytic cracking process, which may contain as low as fractional mol percents hydrogen. Another typical source of a hydrogen-containing gas stream as a charging stock to the present process for effecting the purification of the hydrogen therein is a hydrogen-nitrogen mixture obtained by autothermic reaction of a methane-steam-air mixture, followed by absorption of the carbon dioxide component of the resulting gaseous mixture in an aqueous caustic solution. The hydrogen-nitrogen mixture may contain any concentration of hydrogen. Still another use of the present method of purifying hydrogen is the enrichment of the recycle hydrogen stream of a hydrocarbon reforming process. The hydrogen-containing recycle gas mixture recovered from the downstream side of the reforming reaction is generally contaminated with such gases as hydrogen sulfide and methane and the recycled gas is preferably purified of such contaminants prior to recycle to the reforming reaction zone, the present process providing a convenient means of effecting such purification.

This invention is further illustrated with respect to certain specific embodiments thereof which indicate merely a few of the preferred methods of fabricating a hydrogen diffusion, all in accordance with the present invention and which also indicates the character of the results obtainable thereby in the following examples, the examples being intended merely for illustrative purposes only and not as a limitation on the scope of the invention.

*Example I*

A hydrogen diffusion cell in simplified form is fabricated in accordance with the following procedure. A porous plate measuring 12" x 12" x 1" in dimension is utilized as a supporting porous matrix, the plate consisting of sintered particles of stainless steel powder (18% chromium, 8% nickel steel) molded into a structurally rigid form by heating and compressing the stainless steel powder of 10 microns average diameter at or near the melting point of the stainless steel. The plate is fitted into a housing which hermetically seals the peripheral edge of the plate against the walls of the housing, the plate dividing the housing approximately through its midsection, thereby providing an enclosure on each side of the plate sealed on each side against the leakage of gases from the enclosure on one side of the plate into the enclosure on the other side of the plate. The apparatus is so designed and fabricated that different plates of 1" thickness may be substituted into the mid-section of the housing for test purposes. In the following example, the plate of sintered stainless steel particles which weighs approximately 8.57 kg. has pore diameters which average in diameter from about 2 microns to about 10 microns. When placed in the gas diffusion cell the plate allows approximately 100 cubic feet per minute of a mixture of 25% hydrogen and 75% nitrogen to pass through the plate per minute at an upstream pressure of 10 p. s. i. The porous stainless steel plate indicated above is thereafter soaked in a 0.9% solution of palladium dinitrate placed in a shallow pan, the solution being maintained at a level of ½ inch depth as the solution enters the porous structure of the upstream side of the sintered stainless steel plate. The plate containing the solution of palladium dinitrate is thereafter slowly dried in an oven of 110° C. for 10 hours, followed by heating the impregnated plate in an oven maintained at 900° C. for an additional 12 hours to decompose the palladium dinitrate salt to metallic palladium. The weight of porous plate, after the above treatment increased an additional 4.87 grams and when tested in the gas diffusion cell, the plate permits the passage of 50 cubic feet per minute of a mixture of 25% of hydrogen and 75% nitrogen at an upstream pressure of 10 p. s. i. and at a temperature of 115° C. The diffused gas withdrawn from the chamber on the downstream side of the sintered plate is enriched in hydrogen, containing 45% by volume of hydrogen and 55% by volume of nitrogen. The plate is thereafter removed from the gas diffusion apparatus and placed in a pan containing a 0.045% aqueous solution of palladium dinitrate to a depth of ½" from the top edge of the sintered metal plate. After soaking in the latter solution for 3 hours the plate is again dried and heated for 12 hours at 900° C. and thereafter replaced in the gas diffusion cell for determining the rate of diffusion and the concentration of hydrogen in the diffused gas. At 10 p. s. i. pressure, and with the gas mixture at 115° C. the plate permits the passage of 41 cubic feet per minute of gas enriched in hydrogen, the collected gas containing 93% by volume of hydrogen and 7% by volume of nitrogen.

The plate as prepared by the second impregnation of palladium metal is again placed in the shallow pan containing an aqueous solution of 0.045% by weight of palladium dinitrate for 3 hours, followed by decomposition of the impregnated palladium nitrate at 900° C. for 10 hours. The resulting plate placed in the gas diffusion cell and tested with the previously utilized gas mixture containing 75% nitrogen and 25% hydrogen at a pressure of 10 p. s. i. and temperature of 115° C. on the upstream side permits the passage of 21 cubic feet per minute of a hydrogen concentrate containing 99.5% hydrogen and 0.5% nitrogen. Utilizing a pressure of 100 p. s. i. on the upstream side of the sintered plate containing the palladium membrane, 123 cubic feet per minute of hydrogen concentrate are collected in the diffused gas collection compartment, the concentrate containing 98.4% by volume of hydrogen and 1.6% by volume of nitrogen. At 100 p. s. i. pressure and 300° C., 408 cubic feet per minute of hydrogen concentrate containing 97.5% by volume of hydrogen passes through the cell.

*Example II*

In a similar method of preparing a sintered plate of powdered stainless steel as described in the above Example I, except that in each case the aqueous solution of impregnating salt solution contains 50 mol percent of the palladium dinitrate salt and 50 mol percent of silver nitrate of the total salt concentration of the aqueous solution is utilized to prepare the hydrogen-permeable membrane. Following each impregnation with the above solutions of mixed palladium and silver nitrate, the impregnated plates are dried and the salts contained in the plate decomposed at temperatures of 1000° C. in order to form an alloy of the silver-palladium metals contained in the porous plate. At 100 p. s. i. pressure, a mixture of 75% nitrogen and 25% hydrogen permits the passage of 98 cubic feet per minute of a gas diffusate containing 99.5% hydrogen and 0.5% nitrogen.

I claim as my invention:

1. A process for increasing the concentration of hydrogen in a mixture of gases which comprises passing said mixture at an elevated pressure and temperature through a diffusion zone separated into an upstream portion and a downstream portion by a continuous, hydrogen-permeable membrane comprising a metal of group VIII of the periodic table, said membrane being supported on the downstream side by a porous matrix of compressed sintered metal particles and having sufficient structural rigidity to maintain the continuity of said membrane against the upstream pressure, collecting hydrogen on the downstream side of said membrane and the non-hydrogen components of said mixture on the upstream side of said matrix.

2. The process of claim 1 further characterized in that said metal particles comprise stainless steel powder of from 1 to about 100 microns in thickness.

3. The process of claim 1 further characterized in that said upstream pressure is at least 10 p. s. i.

4. The process of claim 1 further characterized in that the metal of said membrane is seelcted from series 4 and 6 of group VIII.

5. The process of claim 4 further characterized in that said metal is palladium.

6. An apparatus for increasing the concentration of hydrogen in a hydrogen-containing mixture of gases which comprises in combination: a housing comprising an upstream gaseous feed distribution zone and a downstream permeated-hydrogen collection zone, a hydrogen-permeable membrane supported by a porous matrix of compressed sintered metal particles and having sufficient structural rigidity to retain its structure against the upstream pressure of the gaseous feed, said membrane being sealed into said housing between said feed distribution zone and said hydrogen collection zone and comprising a metal of group VIII of the periodic table, said feed distribution zone containing an inlet for said gaseous feed, and an outlet for the non-permeated gases in said feed and said hydrogen-collection zone containing an outlet for permeated hydrogen.

7. The apparatus of claim 6 further characterized in that the metal of said membrane is selected from series 4 and 6 of group VIII.

8. The apparatus of claim 6 further characterized in that said housing contains a feed collection zone and a hydrogen-permeable membrane placed on opposing sides of said permeated hydrogen collection zone.

References Cited in the file of this patent

UNITED STATES PATENTS

| | | |
|---|---|---|
| 1,174,631 | Snelling | Mar. 7, 1916 |
| 1,750,831 | Carns | Mar. 18, 1930 |
| 1,871,226 | Skala | Aug. 9, 1932 |
| 2,078,014 | Oplinger et al. | Apr. 20, 1937 |
| 2,444,222 | Craig | June 29, 1942 |
| 2,597,907 | Steiner | May 27, 1952 |
| 2,609,059 | Benedict | Sept. 2, 1952 |
| 2,618,357 | Harlow | Nov. 18, 1952 |
| 2,626,679 | Harlow | Jan. 27, 1953 |